United States Patent
Joris et al.

(10) Patent No.: US 11,605,200 B2
(45) Date of Patent: Mar. 14, 2023

(54) SYSTEM FOR OPTIMIZING A 3D MESH

(71) Applicant: TWIKIT NV, Berchem (BE)

(72) Inventors: Martijn Joris, Antwerp (BE); Olivier De Deken, Antwerp (BE); Sam Van Den Berghe, Boom (BE)

(73) Assignee: TWIKIT NV, Berchem (BE)

(*) Notice: Subject to any disclaimer, the term of this patent is extended or adjusted under 35 U.S.C. 154(b) by 0 days.

(21) Appl. No.: 17/413,818

(22) PCT Filed: Dec. 12, 2019

(86) PCT No.: PCT/EP2019/084953
§ 371 (c)(1),
(2) Date: Jun. 14, 2021

(87) PCT Pub. No.: WO2020/120698
PCT Pub. Date: Jun. 18, 2020

(65) Prior Publication Data
US 2022/0020214 A1    Jan. 20, 2022

(30) Foreign Application Priority Data
Dec. 12, 2018    (EP) ..................................... 18212106

(51) Int. Cl.
*G06T 17/20*    (2006.01)
*G06T 15/04*    (2011.01)

(52) U.S. Cl.
CPC ............ *G06T 17/205* (2013.01); *G06T 15/04* (2013.01)

(58) Field of Classification Search
CPC ............................... G06T 17/205; G06T 15/04
See application file for complete search history.

(56) References Cited

U.S. PATENT DOCUMENTS

| | | | |
|---|---|---|---|
| 9,401,044 B1* | 7/2016 | Kaufman | G06F 3/017 |
| 10,573,070 B1* | 2/2020 | Tristano | G06F 30/00 |
| 2006/0232596 A1* | 10/2006 | Barenburg | G06T 15/04 |
| | | | 345/581 |

(Continued)

FOREIGN PATENT DOCUMENTS

| | | | | |
|---|---|---|---|---|
| WO | 2007012989 A1 | | 2/2007 | |
| WO | WO2007012989 | * | 2/2007 | ............. G06T 17/20 |
| WO | 2018209886 A1 | | 11/2018 | |

OTHER PUBLICATIONS

Suits et al., "Simplification of Surface Annotations," Proceedings Visualization 2000, Oct. 8-13, 2000, 9 Pages.

(Continued)

*Primary Examiner* — Phuc N Doan
(74) *Attorney, Agent, or Firm* — Workman Nydegger

(57) ABSTRACT

A system for transferring a mesh into a 3D mesh, includes: a mesh receiving unit receiving a first mesh and a second mesh; a mapping unit mapping the mesh onto the 3D mesh, thereby generating a combined mesh comprising combined vertices; an intersection calculating unit calculating intersection vertices formed between the mesh and the 3D mesh in the combined mesh and further configured to add the intersection vertices to the combined mesh; and an edge calculating unit calculating combined edges between the intersection vertices and the combined vertices. The edge calculating unit is further configured to add the combined edges to the combined mesh.

12 Claims, 9 Drawing Sheets

(56) References Cited

U.S. PATENT DOCUMENTS

| | | |
|---|---|---|
| 2007/0080963 A1* | 4/2007 | Christophe ............. G06T 15/04 |
| | | 345/427 |
| 2010/0053172 A1 | 3/2010 | Derose et al. |
| 2013/0300736 A1* | 11/2013 | Schmidt ................. G06T 19/20 |
| | | 345/419 |
| 2013/0307848 A1 | 11/2013 | Tena et al. |
| 2017/0132846 A1* | 5/2017 | Iverson ................... G06T 17/20 |
| 2017/0301133 A1* | 10/2017 | Min ........................ G06T 15/04 |
| 2017/0309058 A1* | 10/2017 | Jennings ................. G06T 17/10 |

OTHER PUBLICATIONS

Search Report and Written Opinion from corresponding European Application No. EP18212106, dated May 13, 2019.
International Search Report and Written Opinion from PCT Application No. PCT/EP2019/084953, dated Feb. 13, 2020.

* cited by examiner

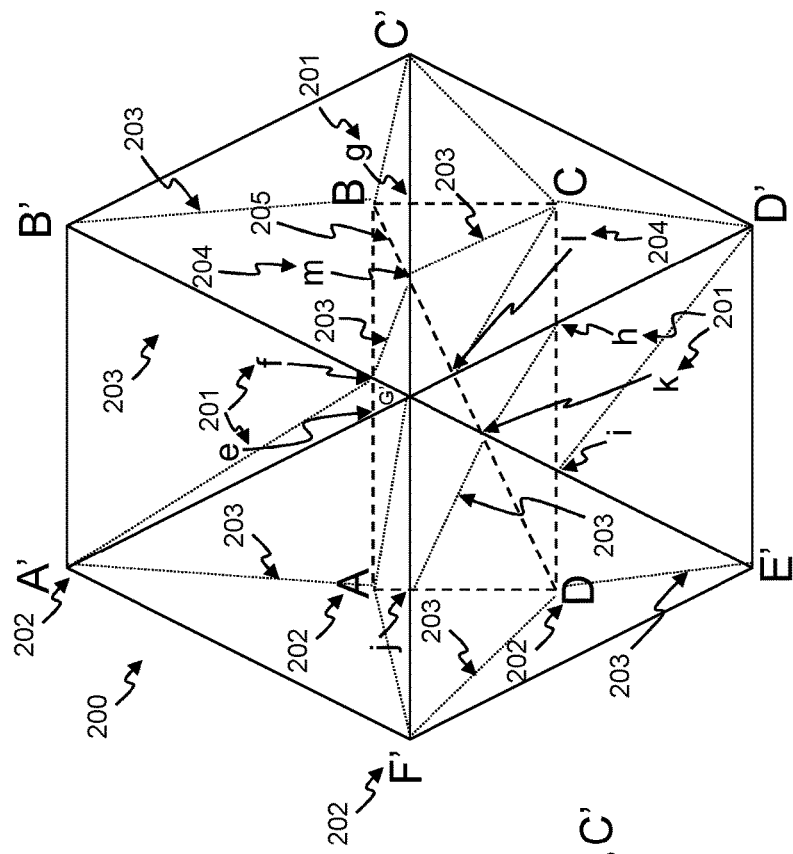
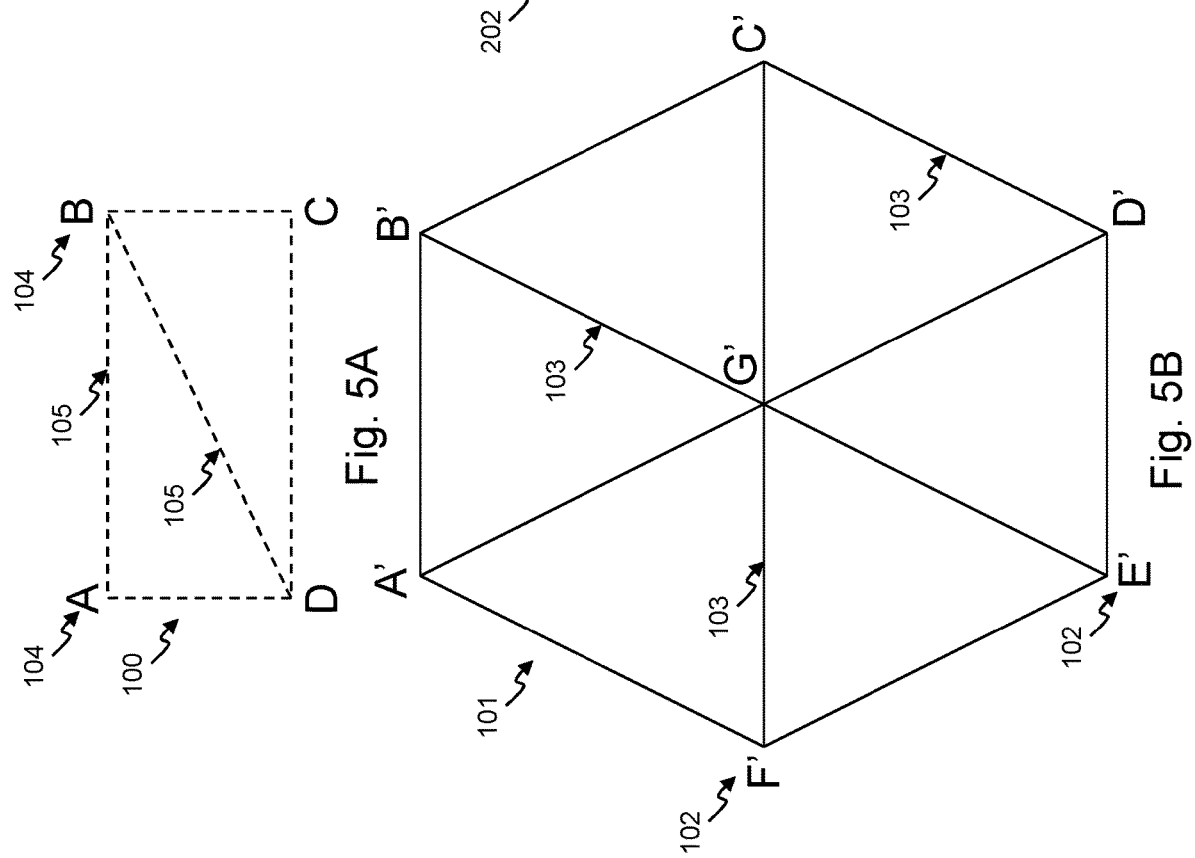
Fig. 5A
Fig. 5B
Fig. 5C

SYSTEM FOR OPTIMIZING A 3D MESH

FIELD OF THE INVENTION

The present invention generally relates to the field of computer-generated imagery. More particularly, the present invention relates to optimizing a three-dimensional model, i.e. a digital representation in a three-dimensional space, by transferring another mesh into the three-dimensional mesh of the three-dimensional model.

BACKGROUND OF THE INVENTION

Computer-aided design, also referred to as CAD, is the use of computer systems to aid in the creation, the modification, the analysis, and/or the optimization of a design. CAD may be used to design curves and figures in a two-dimensional space; or curves, surfaces, and models of structures in a three-dimensional space. The use of three-dimensional models, also referred to as 3D models, generated via CAD has improved the ability to design and build three-dimensional structures, for example in the worlds of engineering, mechanics, medicine, video games, movie industry, automotive, shipbuilding, aerospace industries, industrial and architectural design, prosthetics, and many more. CAD software is used to increase the productivity of a designer, improve the quality of design, improve communications through documentation, create a database for manufacturing, etc. CAD output is often in the form of electronic files comprising graphics showing the overall appearance of designed structures, and the files must convey information, such as design parameters of the three-dimensional structures, materials, processes, dimensions, and tolerances, according to application-specific conventions.

A mesh can be the structure which gives shape to a model. The mesh of a model may include, in addition to information specifying vertices and edges, additional pieces of information, such as for example texture. Texture may be shared between meshes having different topologies and geometries. For example, texture associated with the mesh of one model can be shared with or transferred for example into the mesh of another model or can be shared with or transferred for example into another version of the mesh of the same model. Examples of such transfers are described in WO2018/209886A1 and in the publication of Frank Suits et al. entitled "Simplification of Surface Annotations" published in the proceedings of the Annual IEEE Conference on Visualization which took place on Oct. 8-13, 2000.

UV mapping is a 3D modelling process of projecting a 2D image to a 3D model's surface for texture mapping that is commonly used in computer-aided design. In other words, UV mapping is a technique to map every vertex of a 3D mesh in a 1-to-1 way to a 2D plane. UV texturing permits polygons that make up a mesh of a 3D object to be for example painted with color and/or other surface attributes from an image. The image is called a UV texture map. The UV mapping process involves assigning pixels in the image to surface mappings on the polygon, usually done by copying a triangular piece of the image map and pasting it onto a triangle on the object. UV texturing maps into a texture space rather than into the geometric space of the object. The rendering computation uses the UV texture coordinates to determine how for example to paint the three-dimensional surface. When a model is created as for example a polygon mesh using a 3D modeller, UV coordinates can be generated for each vertex in the mesh. In other words, the UV mapping process requires three steps: unwrapping the mesh, creating the texture, and applying the texture. One way is for the 3D modeller to unfold the triangle mesh at the seams, automatically laying out the triangles on a flat page. If the mesh is for example a UV sphere, the modeller might transform it into for example an equirectangular projection. Once the model is unwrapped, the modeller can paint a texture on each triangle individually, using the unwrapped mesh as a template.

US2010/0053172A1 describes a computer-implemented method for transferring information from one mesh of a model to another mesh using UV spaces. The transferred information consists of texture. US2010/0053172A1 describes a correspondence built between a source mesh and a destination mesh and which provides the sharing of information on, at, or near one mesh to designated locations of another mesh. The correspondence in US2010/0053172A1 may be constructed between all points on surfaces of the meshes, rather than merely mesh vertices alone. The correspondence in US2010/0053172A1 may also be constructed based on parametrization information, such as UV sets, texture maps, and any other discontinuities associated with a model.

The computer-implemented method described in US2010/0053172A1 relies on the information coupled to each point of a mesh. In US2010/0053172A1, the points of both meshes can be mapped from for example UV maps between the two meshes. The method of US2010/0053172A1 does not bring the geometry of one mesh into the geometry of another mesh. In other words, the method of US2010/0053172A1 does not change the geometry of the meshes; the method of US2010/0053172A1 simply transfers information coupled to each point between the two meshes. In other words, the method of US2010/0053172A1 allows optimizing one mesh only by adding to this mesh information regarding texture comprised in another mesh. There is no modification of the geometry of the mesh to which the information is added. It is therefore not possible to optimize the geometry of a mesh with the method of US2010/0053172A1.

SUMMARY OF THE INVENTION

It is an objective of the present invention to disclose a system that overcomes the above identified shortcomings of existing solutions. More particularly, it is an objective to disclose a system and the related method for transferring a mesh into a three-dimensional mesh to optimize the geometry of the three-dimensional mesh.

According to a first aspect of the present invention, the above defined objectives are realized by a system for transferring a first mesh into a second mesh, the system comprising:
a mesh receiving unit configured to receive a first mesh and a second mesh, wherein the second mesh is a three-dimensional mesh different from the first mesh, and wherein the second mesh comprises a UV map;
a mapping unit configured to map the first mesh onto the second mesh in function of the UV map, thereby generating a combined mesh comprising combined vertices;
an intersection calculating unit configured to calculate intersection vertices formed between the first mesh and the second mesh in the combined mesh and further configured to add the intersection vertices to the combined mesh; and
an edge calculating unit configured to calculate combined edges between the intersection vertices and the combined vertices; wherein the edge calculating unit is further configured to add the combined edges to the combined mesh.

The system according to the present invention allows optimizing the geometry of a second mesh which is a three-dimensional mesh, also referred to as 3D mesh, by transferring the geometry of a first mesh into the geometry of the second mesh. In other words, the system according to the present invention integrates the geometry of a first mesh into the geometry of a second mesh which is non-flat. Contrary to existing solutions to transfer information from one mesh of a model into another mesh using UV spaces, the system according to the present invention not only transfers vertices of one mesh into another mesh, but also transfers the geometrical structure of the mesh into the other mesh, thereby enriching the other mesh with the vertices and the geometry of the first mesh. In other words, the system according to the present invention allows transforming and integrating the geometrical structure defined in a first mesh onto a genuine three-dimensional mesh.

The system according to the present invention can for example be used in the context of wrapping applications. For example, the system according to the present invention could allow customers of a 3D customization platform to customize a predefined 3D model of an object at their convenience by transferring for example a 2D mesh into the 3D mesh of the object. Additionally, the system according to the present invention can also be used in the context of morphing to apply modifications to the geometry of a 3D model. Finally, improved versions of a geometry shader that creates extra vertices in a 3D model where needed for the design and/or by the designer can be achievable with the system according to the present invention.

The combined mesh generated by the mapping unit when mapping the mesh vertices to the second mesh in function of the UV map therefore comprises 3D mesh vertices of the second mesh and further comprises mesh vertices of the first mesh that were translated onto the second mesh. The combined vertices according to the present invention are therefore the 3D mesh vertices of the second mesh and the mesh vertices of the first mesh that were translated onto the second mesh by the mapping unit. According to the present invention, the intersection vertices are the vertices formed in the combined mesh where the mesh edges of the first mesh intersect the 3D mesh edges of the second mesh when the mesh vertices of the first mesh were translated onto the second mesh by the mapping unit. According to the present invention, the combined edges are formed between the intersection vertices and the combined vertices in the combined mesh.

The first mesh is endowed with a UV map. The first mesh is preferably located in the image of the UV map of the second mesh. Using the inverse of the UV map, the mesh vertices of the first mesh can be translated to adequate positions on the second mesh. A user of the system according to the present invention for example predetermines the adequate positions for the mesh vertices of the first mesh on the second mesh. At this point, the first mesh is translated such that it roughly follows the surface of the second mesh in a combined mesh generated when translating the first mesh on the second mesh. In other words, only the mesh vertices of the first mesh lie on the surface of the second mesh in the combined mesh. But the first mesh and the second mesh are still two separate geometrical structures that are not related to each other. In order to integrate the geometry of the first mesh into the geometry of the second mesh, the intersection vertices formed between the first mesh and the second mesh in the combined mesh are added to the combined mesh, thereby generating combined vertices in the combined mesh. Additionally, the geometry of the first mesh is translated as well on the second mesh. Indeed, all the edges of the first mesh which are fully comprised in a face of the second mesh when the first mesh is translated on the second mesh are added to the combined mesh. Additionally, for all the other edges which are not fully comprised in a face of the second mesh when the first mesh is translated on the second mesh, the first mesh is extruded along normals of the combined mesh, thereby forming extruded walls of the first mesh. In other words, an extruded wall corresponds uniquely to a single edge of between two points of the translated mesh. If they exist, combined intersection vertices formed between the extruded walls and the combined edges of the combined mesh are calculated. The combined intersection vertices are then added to the combined mesh and combined edges between the combined intersection vertices and the combined vertices are calculated and added to the combined mesh. The geometrical structure of the first mesh is therefore fully integrated in the geometrical structure of the second mesh in the combined mesh.

According to an optional aspect of the invention, the second mesh comprises a plurality of n-polygons, wherein $n \geq 3$.

For example, the second mesh is a curved mesh. For example, the second mesh is a triangulated curved mesh. A digital triangulated 3D object is a 3D object represented by means of a collection of triangles forming a mesh of the 3D object. The collection of triangles comprises vertices, which are the corner points needed to describe the 3D object, and further comprises faces. The faces are the triangles which connect three different and non-colinear vertices together and which define the surface area of the object.

In 3D computer graphics, polygonal modeling is an approach for modeling objects by representing or approximating their surfaces using polygons. Polygonal modeling is for example well suited to scanline rendering and is therefore the method of choice for real-time computer graphics. The basic object used in mesh modeling is a vertex, a point in three-dimensional space. Two vertices connected by a straight line become an edge. Three vertices, connected to each other by three edges, define a triangle, which is the simplest polygon in Euclidean space. More complex polygons can be created out of multiple triangles, or as a single object with more than three vertices. Four sided polygons and triangles are the most common shapes used in polygonal modeling. A group of polygons, connected to each other by shared vertices, is generally referred to as an element. Each of the polygons making up an element is called a face. In Euclidean geometry, any three non-collinear points determine a plane. For this reason, triangles always inhabit a single plane. This is not necessarily true of more complex polygons, however. The flat nature of triangles makes it simple to determine their surface normal, a three-dimensional vector perpendicular to the triangle's surface, also referred to as normal or surface normals. Note that every triangle has two face normals, which point to opposite directions from each other.

Alternatively, the second mesh comprises for example a plurality of n sided polygons, i.e. n-polygons wherein n is an integer and wherein n is larger than or equal to 3.

According to an optional aspect of the invention, the first mesh is a mesh diffeomorphic to a flat mesh.

In mathematics, a diffeomorphism is an isomorphism of smooth manifolds. Diffeomorphism is an invertible function that maps one differentiable manifold to another such that both the function and its inverse are smooth. For example, the mesh is a two-dimensional mesh or 2D mesh which is diffeomorphic to a flat mesh. For example, the mesh is a triangulated two-dimensional mesh or 2D mesh which is diffeomorphic to a flat mesh. Alternatively, the mesh comprises a plurality of n-polygons, wherein n≥3, and the mesh is diffeomorphic to a flat mesh.

Alternatively, the first mesh is for example a curved mesh. For example, the first mesh is for example a three-dimensional mesh. Alternatively, the first mesh is for example a curved mesh comprising a plurality of n '-polygons, wherein n'≥3. For example, the first mesh is for example a three-dimensional mesh comprising a plurality of n'-polygons, wherein n'≥3.

According to an optional aspect of the invention:
the mesh receiving unit is configured to receive 3D mesh vertices and 3D mesh edges of the second mesh and the mesh receiving unit is further configured to receive mesh vertices and mesh edges of the first mesh;
the mapping unit is configured to map the mesh vertices to the second mesh in function of the UV map, thereby generating the combined mesh;
the intersection calculating unit is configured to calculate the intersection vertices formed between the mesh edges and the 3D mesh edges in the combined mesh and further configured to add the intersection vertices to the combined mesh.

This way, a combined mesh is generated. The first mesh is endowed with a UV map. The first mesh is preferably located in the image of the UV map. Using the inverse of the UV map, the mesh vertices of the first mesh can be translated to adequate positions on the second mesh. The combined mesh generated by the mapping unit when mapping the mesh vertices to the second mesh in function of the UV map therefore comprises 3D mesh vertices of the second mesh and further comprises mesh vertices of the first mesh that were translated onto the second mesh. The combined vertices are therefore the 3D mesh vertices of the second mesh and the mesh vertices of the first mesh that were translated onto the second mesh by the mapping unit. At this point, the first mesh is translated such that it roughly follows the surface of the second mesh in a combined mesh generated when translating the first mesh on the second mesh. In other words, only the mesh vertices of the first mesh lie on the surface of the second mesh in the combined mesh. But the first mesh and the second mesh are still two separate geometrical structures that are not related to each other. In order to integrate the geometry of the first mesh into the geometry of the second mesh, the intersection vertices formed between the first mesh and the second mesh in the combined mesh are added to the combined mesh, thereby generating combined vertices in the combined mesh.

According to an optional aspect of the invention, the image of the UV map comprises the first mesh.

This way, the system integrates the geometrical structure of the first mesh into the geometrical structure of the second mesh.

According to an optional aspect of the invention, the system further comprises an affine transforming unit configured to apply an affine transformation on the first mesh when the image of the UV map does not comprise the first mesh; and wherein the affine transforming unit is thereby configured to transform the first mesh into the image of the UV map.

This way, when the UV map does not comprise the first mesh, the affine transforming unit applies an adequate affine transformation of the first mesh such that the first mesh can be translated on the second mesh.

According to an optional aspect of the invention, the intersection calculating unit is further configured to extrude the first mesh along normals of the combined mesh, thereby forming extruded walls of the first mesh; and wherein the intersection calculating unit is further configured to identify combined intersection vertices formed between the extruded walls and the combined edges of the combined mesh.

This way, the combined intersection vertices are added to the combined mesh.

According to an optional aspect of the invention, the edge calculating unit is further configured to calculate the combined intersection edges between the combined intersection vertices and the combined vertices in the combined mesh.

This way, the system adds combined intersection edges to the combined mesh such that the combined mesh comprising the combined vertices and further comprising the combined intersection vertices comprises a plurality of n"-polygons, wherein n"≥3. In other words, the edge calculating unit of the system is adapted to calculate the combined mesh comprising the combined vertices and further comprising the combined intersection vertices such that the combined mesh is formed by a plurality of n"-polygons, wherein n"≥3, when the 3D mesh comprises a plurality of n-polygons, wherein n≥3. For example, the edge calculating unit of the system is adapted to triangulate the combined mesh comprising the combined vertices and further comprising the combined intersection vertices such that the combined mesh is formed by a plurality of n"-polygons, wherein n"≥3, when the 3D mesh comprises a plurality of n-polygons, wherein n≥3. The edge calculating unit is further configured to add the combined intersection edges to the combined mesh.

According to an optional aspect of the invention, the mapping unit is configured to apply inverse UV mapping.

According to a second aspect of the invention, there is provided a method for transferring a first mesh into a second mesh, the method comprising the steps of:
receiving a first mesh;
receiving a second mesh, wherein the second mesh is a three-dimensional mesh different from the first mesh and wherein the second mesh comprises a UV map;
mapping the first mesh onto the second mesh in function of the UV map, thereby generating a combined mesh comprising combined vertices;
calculating intersection vertices formed between the first mesh and the second mesh in the combined mesh; and further adding the intersection vertices to the combined mesh; and calculating combined edges between the intersection vertices and the combined vertices in the combined mesh; and further adding the combined edges to the combined mesh.

The method according to the present invention is a computer-implemented method. The method according to the present invention allows optimizing the geometry of a three-dimensional mesh by transferring the geometry of a first mesh into the geometry of the three-dimensional mesh. In other words, the method according to the present invention integrates the geometry of a first mesh into the geometry of a three-dimensional mesh which is non-flat. Contrary to existing solutions to transfer information from one mesh of a model into another mesh using UV spaces, the method according to the present invention not only transfers vertices of one mesh into another mesh, but also transfers the geometrical structure of the mesh into the other mesh, thereby enriching the other mesh with the vertices and the geometry of the first mesh. In other words, the method according to the present invention allows transforming and integrating the geometrical structure defined in a first mesh onto a genuine three-dimensional mesh.

The combined mesh generated by the mapping unit when mapping the mesh vertices to the second mesh in function of the UV map therefore comprises 3D mesh vertices of the second mesh and further comprises mesh vertices of the first mesh that were translated onto the second mesh. The combined vertices are therefore the 3D mesh vertices of the second mesh and the mesh vertices of the first mesh that were translated onto the second mesh by the mapping unit.

The first mesh is endowed with a UV map. The first mesh is preferably located in the image of the UV map of the second mesh. Using the inverse of the UV map, the mesh vertices of the first mesh can be translated to adequate positions on the second mesh. The adequate positions for the mesh vertices of the first mesh on the second mesh can for example be predetermined when performing the method according to the present invention. At this point, the first mesh is translated such that it roughly follows the surface of the second mesh in a combined mesh generated when translating the first mesh on the second mesh. In other words, only the mesh vertices of the first mesh lie on the surface of the second mesh in the combined mesh. But the first mesh and the second mesh are still two separate geometrical structures that are not related to each other. In order to integrate the geometry of the first mesh into the geometry of the second mesh, the intersection vertices formed between the first mesh and the second mesh in the combined mesh are added to the combined mesh, thereby generating combined vertices in the combined mesh. Additionally, the geometry of the first mesh is translated as well on the second mesh. Indeed, all the edges of the first mesh which are fully comprised in a face of the second mesh when the first mesh is translated on the second mesh are added to the combined mesh. Additionally, for all the other edges which are not fully comprised in a face of the second mesh when the first mesh is translated on the second mesh, the first mesh is extruded along normals of the combined mesh, thereby forming extruded walls of the first mesh. In other words, an extruded wall corresponds uniquely to a single edge of between two points of the translated mesh. If they exist, combined intersection vertices formed between the extruded walls and the combined edges of the combined mesh are calculated. The combined intersection vertices are then added to the combined mesh and combined edges between the combined intersection vertices and the combined vertices are calculated and added to the combined mesh. The geometrical structure of the first mesh is therefore fully integrated in the geometrical structure of the second mesh in the combined mesh.

According to an optional aspect of the invention:
the step of receiving a second mesh corresponds to receiving 3D mesh vertices and 3D mesh edges of the second mesh;
the step of receiving a first mesh corresponds to receiving mesh vertices and mesh edges of the first mesh;
the step of mapping the first mesh into the second mesh in function of the UV map corresponds to mapping the mesh vertices to the second mesh in function of the UV map, thereby generating the combined mesh comprising the combined vertices; and
the step of calculating the intersection vertices corresponds to calculating the intersection vertices formed between the mesh edges and the 3D mesh edges and further adding the intersection vertices to the combined mesh.

This way, the combined vertices are added to the combined mesh. The first mesh is endowed with a UV map. The first mesh is preferably located in the image of the UV map. Using the inverse of the UV map, the mesh vertices of the mesh can be translated to adequate positions on the second mesh. At this point, the first mesh is translated such that it roughly follows the surface of the second mesh in a combined mesh generated when translating the first mesh on the second mesh. In other words, only the mesh vertices of the first mesh lie on the surface of the second mesh in the combined mesh. But the first mesh and the second mesh are still two separate geometrical structures that are not related to each other. In order to integrate the geometry of the first mesh into the geometry of the second mesh, the intersection vertices formed between the first mesh and the second mesh in the combined mesh are added to the combined mesh, thereby generating combined vertices in the combined mesh.

The current invention in addition also relates to a computer program comprising software code adapted to perform the method according to the present invention.

The invention further relates to a computer readable storage medium comprising the computer program according to the present invention.

The invention further relates to a computer readable storage medium comprising computer-executable instructions which, when executed by a computing system, perform the method according to the present invention.

BRIEF DESCRIPTION OF THE DRAWINGS

FIG. 5A to 5C schematically illustrate an embodiment of the method according to the present invention.

DETAILED DESCRIPTION OF EMBODIMENT(S)

Figure 1:
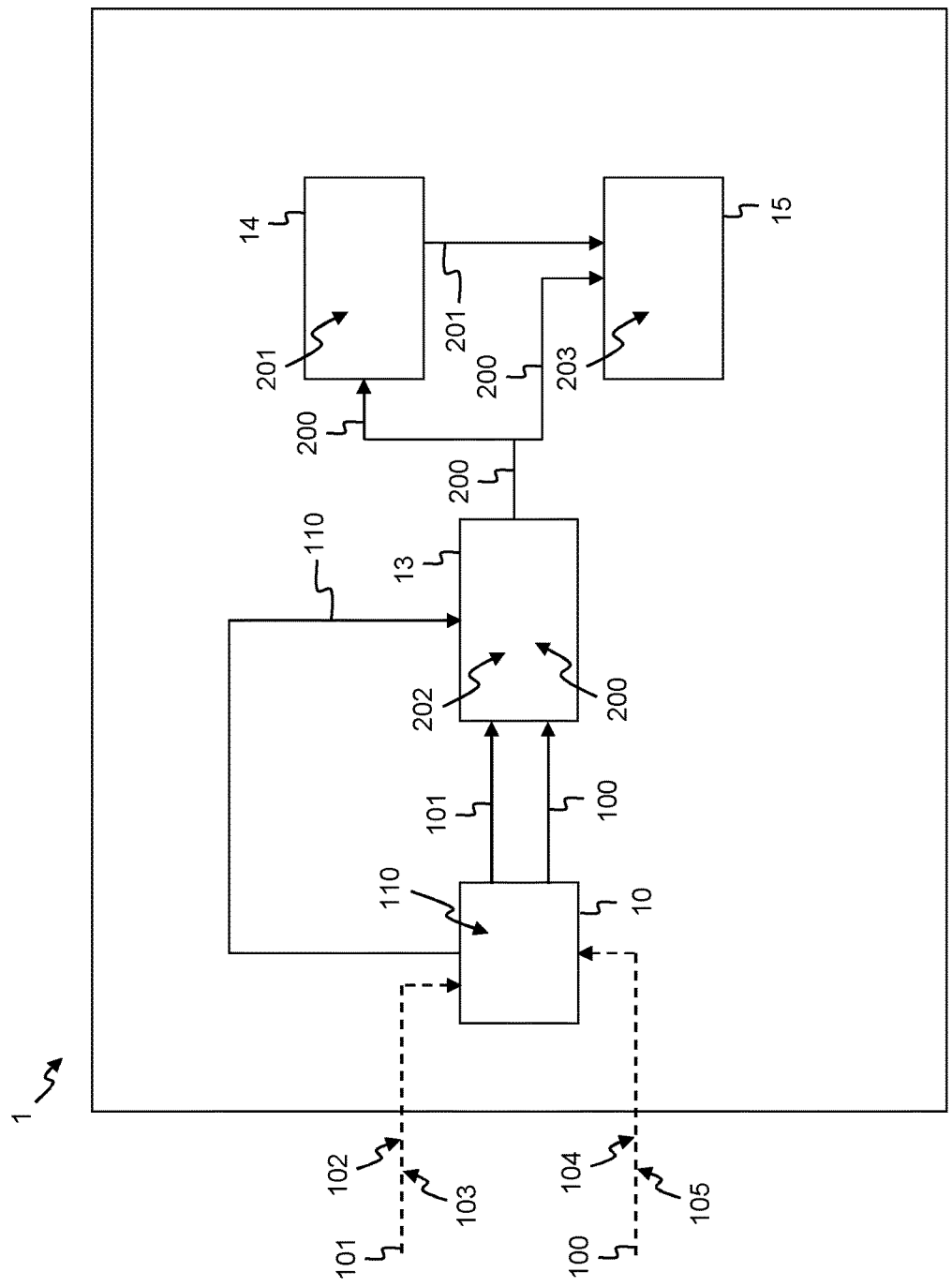
FIG. 1 schematically illustrates an embodiment of a system according to the present invention.

According to an embodiment shown in FIG. 1, a system 1 for transferring a first mesh 100 into a second mesh 101 comprises a mesh receiving unit 10, a mapping unit 13, an intersection calculating unit 14 and an edge calculating unit 15. The mesh receiving unit 10 receives a second mesh 101, and the second mesh 101 comprises a UV map 110. The second mesh 101 is a three-dimensional mesh and the second mesh 101 is different from the first mesh 100. The second mesh 101 for example comprises a plurality of n-polygons, wherein n≥3. The mesh receiving unit 10 receives a first mesh 100. The first mesh 100 is for example a mesh diffeomorphic to a flat mesh. The mapping unit 13 maps the first mesh 100 onto the second mesh 101 in function of the UV map 110. The UV map 110 comprises the first mesh 100. The mapping unit 13 thereby generates a combined mesh 200 which comprises combined vertices 202. The intersection calculating unit 14 calculates intersection vertices 201 formed between the first mesh 100 and the second mesh 101 in the combined mesh 200. The intersection calculating unit 14 also adds the intersection vertices 201 to the combined mesh 200. The edge calculating unit 15 calculates combined edges 203 between the intersection vertices 201 and the combined vertices 202. The edge calculating unit 15 adds the combined edges 203 to the combined mesh 200. According to an alternative embodiment, the system 1 comprises a first mesh receiving unit configured to receive the first mesh 100 and the system 1 further comprises a second mesh receiving unit configured to receive the second mesh 101, wherein the second mesh receiving unit is different from the first mesh receiving unit.

Figure 2:
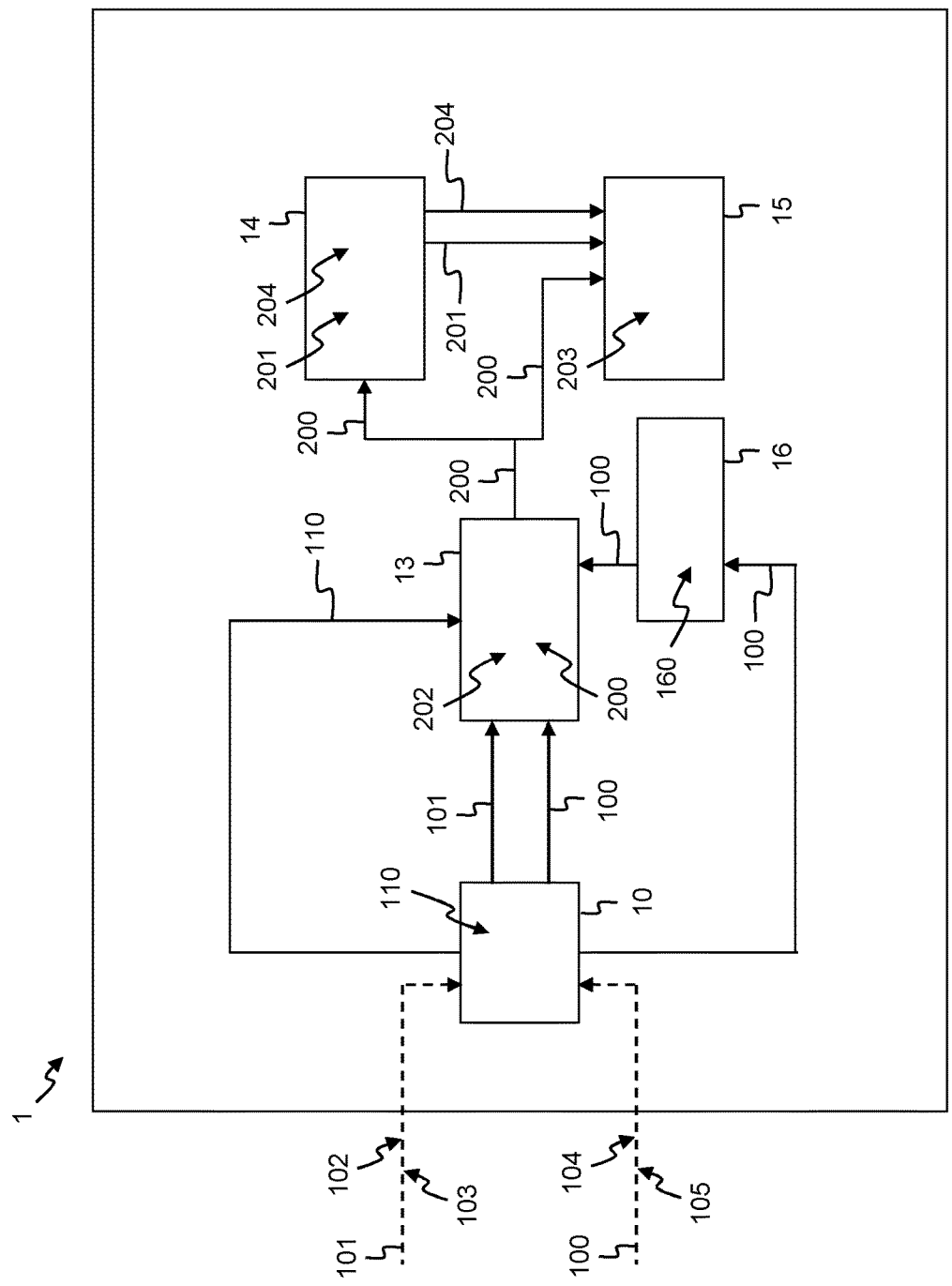
FIG. 2 schematically illustrates an embodiment of a system according to the present invention.

According to an embodiment shown in FIG. 2, a system 1 for transferring a first mesh 100 into a second mesh 101 comprises a mesh receiving unit 10, a mapping unit 13, an intersection calculating unit 14, an edge calculating unit 15 and an affine transforming unit 16. The mesh receiving unit 10 receives a second mesh 101, and the second mesh 101 comprises a UV map 110. The second mesh 101 is a three-dimensional mesh and the second mesh 101 is different from the first mesh 100. The second mesh 101 for example comprises a plurality of n-polygons, wherein n≥3. The second mesh 101 comprises 3D mesh vertices 102 and 3D mesh edges 103. The mesh receiving unit 10 receives a first mesh 100. The first mesh 100 is for example a mesh diffeomorphic to a flat mesh. The first mesh 100 comprises mesh vertices 104 and mesh edges 105. The mesh receiving unit 10 receives mesh vertices 104 and mesh edges 105 of the first mesh 100. The UV map 110 does not comprise the first mesh 100. The affine transforming unit 16 applies an affine transformation 160 on the first mesh 100. The affine transformation 160 transforms the first mesh 100 into the image of the UV map 110. The mapping unit 13 maps the first mesh 100 onto the second mesh 101 in function of the UV map 110. More particularly, the mapping unit 13 maps the mesh vertices 104 of the first mesh 100 to the second mesh 101 in function of the UV map 110. The mapping unit 13 thereby generates a combined mesh 200 which comprises combined vertices 202. The combined vertices 202 of the combined mesh 200 comprise the mesh vertices 104 from the first mesh 100 and 3D mesh vertices 102 from the second mesh 101. The intersection calculating unit 14 calculates intersection vertices 201 formed between the first mesh 100 and the second mesh 101 in the combined mesh 200. The intersection calculating unit 14 also adds the intersection vertices 201 to the combined mesh 200. More particularly, the intersection calculating unit 14 calculates the intersection vertices 201 formed between the mesh edges 105 and the 3D mesh edges 103 in the combined mesh 200. The edge calculating unit 15 calculates combined edges 203 between the intersection vertices 201 and the combined vertices 202. The edge calculating unit 15 adds the combined edges 203 to the combined mesh 200. According to an alternative embodiment, the system 1 comprises a first mesh receiving unit configured to receive the first mesh 100 and the system 1 further comprises a second mesh receiving unit configured to receive the second mesh 101, wherein the second mesh receiving unit is different from the first mesh receiving unit.

Figure 3:
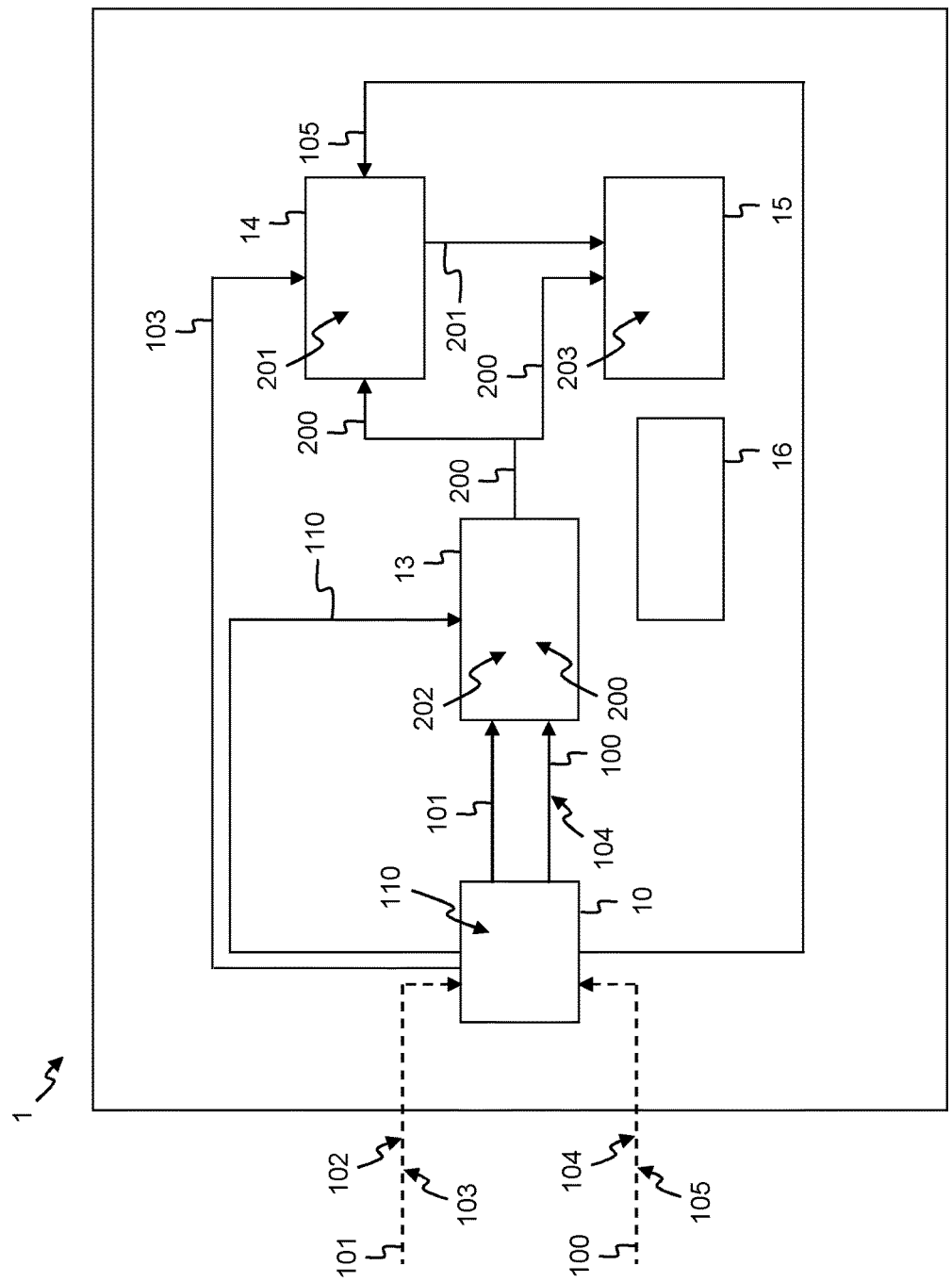
FIG. 3 schematically illustrates an embodiment of a system according to the present invention.

According to an embodiment shown in FIG. 3, a system 1 for transferring a first mesh 100 into a second mesh 101 comprises a mesh receiving unit 10, a mapping unit 13, an intersection calculating unit 14, an edge calculating unit 15 and an affine transforming unit 16. The mesh receiving unit 11 receives a second mesh 101, and the second mesh 101 comprises a UV map 110. The second mesh 101 is a three-dimensional mesh and the second mesh 101 is different from the first mesh 100. The second mesh 101 for example comprises a plurality of n-polygons, wherein n≥3. The second mesh 101 comprises 3D mesh vertices 102 and 3D mesh edges 103. The mesh receiving unit 10 receives a first mesh 100. The first mesh 100 is for example a mesh diffeomorphic to a flat mesh. The first mesh 100 comprises mesh vertices 104 and mesh edges 105. The mesh receiving unit 10 receives mesh vertices 104 and mesh edges 105 of the first mesh 100. The mapping unit 13 maps the first mesh 100 onto the second mesh 101 in function of the UV map 110. More particularly, the mapping unit 13 maps the mesh vertices 104 of the first mesh 100 to the second mesh 101 in function of the UV map 110. The UV map 110 comprises the first mesh 100. The mapping unit 13 thereby generates a combined mesh 200 which comprises combined vertices 202. The combined vertices 202 of the combined mesh 200 comprise the mesh vertices 104 from the first mesh 100 and 3D mesh vertices 102 from the second mesh 101. The intersection calculating unit 14 calculates intersection vertices 201 formed between the first mesh 100 and the second mesh 101 in the combined mesh 200. The intersection calculating unit 14 also adds the intersection vertices 201 to the combined mesh 200. More particularly, the intersection calculating unit 14 calculates the intersection vertices 201 formed between the mesh edges 105 and the 3D mesh edges 103 in the combined mesh 200. The edge calculating unit 15 calculates combined edges 203 between the intersection vertices 201 and the combined vertices 202. The edge calculating unit 15 adds the combined edges 203 to the combined mesh 200. According to an alternative embodiment, when the UV map 110 does not comprise the first mesh 100, the affine transforming unit 16 applies an affine transformation 160 on the first mesh 100. The affine transformation 160 transforms the first mesh 100 into the image of the UV map 110. According to an alternative embodiment, the system 1 comprises a first mesh receiving unit configured to receive the first mesh 100 and the system 1 further comprises a second mesh receiving unit configured to receive the second mesh 101, wherein the second mesh receiving unit is different from the first mesh receiving unit.

Figure 4:
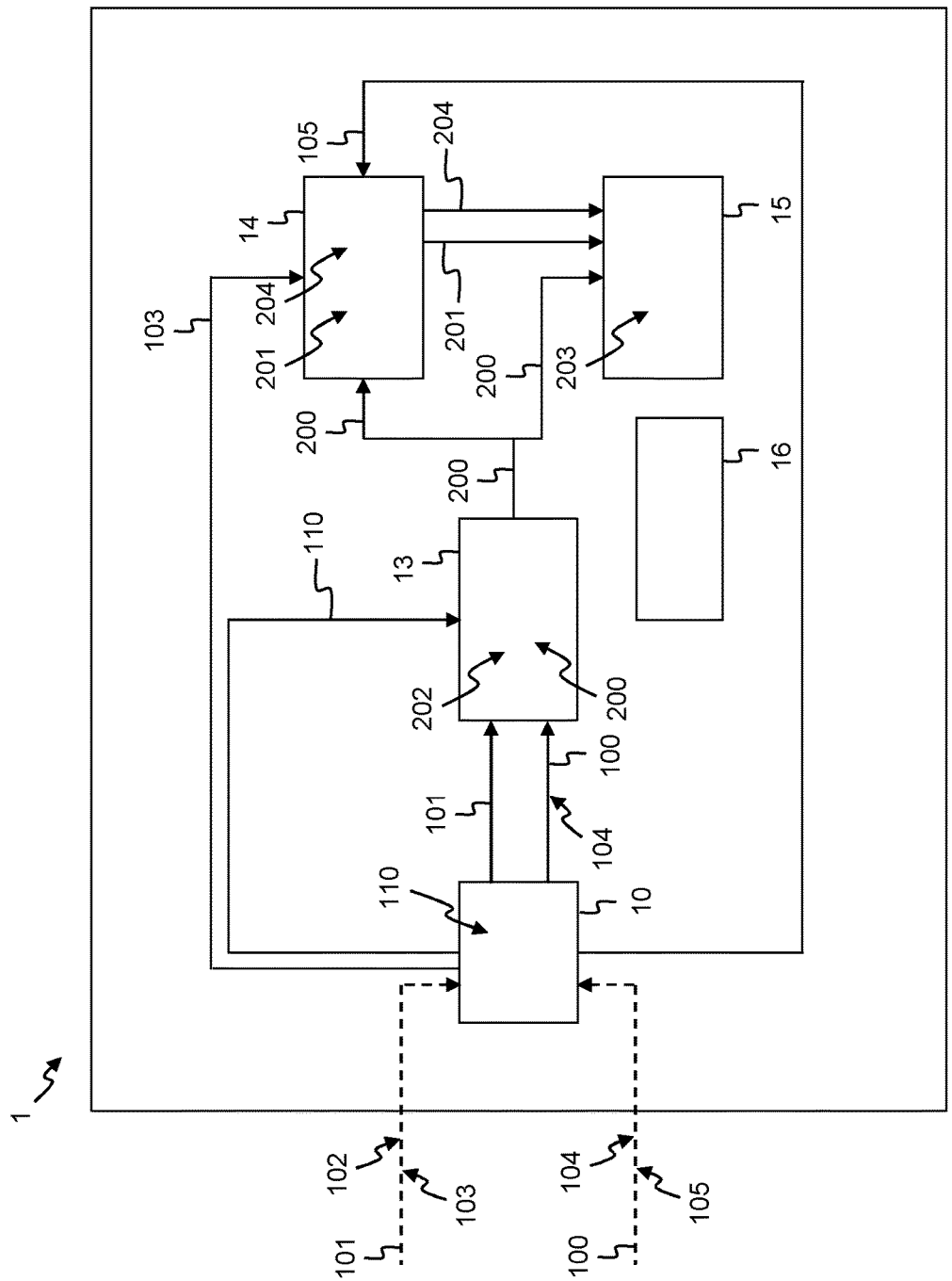
FIG. 4 schematically illustrates an embodiment of a system according to the present invention.

According to an embodiment shown in FIG. 4, a system 1 for transferring a first mesh 100 into a second mesh 101 comprises a mesh receiving unit 10, a mapping unit 13, an intersection calculating unit 14, an edge calculating unit 15 and an affine transforming unit 16. The mesh receiving unit 10 receives a second mesh 101, and the second mesh 101 comprises a UV map 110. The second mesh 101 is a three-dimensional mesh and the second mesh 101 is different from the first mesh 100. The second mesh 101 for example comprises a plurality of n-polygons, wherein n≥3. The second mesh 101 comprises 3D mesh vertices 102 and 3D mesh edges 103. The mesh receiving unit 10 receives a first mesh 100. The first mesh 100 is for example a mesh diffeomorphic to a flat mesh. The first mesh 100 comprises mesh vertices 104 and mesh edges 105. The mesh receiving unit 10 receives mesh vertices 104 and mesh edges 105 of the first mesh 100. The mapping unit 13 maps the first mesh 100 onto the second mesh 101 in function of the UV map 110. More particularly, the mapping unit 13 maps the mesh vertices 104 of the first mesh 100 to the second mesh 101 in function of the UV map 110. The UV map 110 comprises the first mesh 100. The mapping unit 13 thereby generates a combined mesh 200 which comprises combined vertices 202. The combined vertices 202 of the combined mesh 200 comprise the mesh vertices 104 from the first mesh 100 and 3D mesh vertices 102 from the second mesh 101. The intersection calculating unit 14 calculates intersection vertices 201 formed between the first mesh 100 and the second mesh 101 in the combined mesh 200. The intersection calculating unit 14 also adds the intersection vertices 201 to the combined mesh 200. More particularly, the intersection calculating unit 14 calculates the intersection vertices 201 formed between the mesh edges 105 and the 3D mesh edges 103 in the combined mesh 200. The edge calculating unit 15 calculates combined edges 203 between the intersection vertices 201 and the combined vertices 202. The edge calculating unit 15 adds the combined edges 203 to the combined mesh 200. According to an alternative embodiment, when the UV map 110 does not comprise the first mesh 100, the affine transforming unit 16 applies an affine transformation 160 on the first mesh 100. The affine transformation 160 transforms the first mesh 100 into the image of the UV map 110. The intersection calculating unit 14 extrudes the first mesh 100 along normal of the combined mesh 200, thereby forming extruded walls of the first mesh 100. The intersection calculating unit 14 identifies combined intersection vertices 204 formed between the extruded walls and the combined edges 203 of the combined mesh 200. The edge calculating unit 17 calculates the combined edges 203 between the combined intersection vertices 204 and the combined vertices 202 in the combined mesh 200. According to an alternative embodiment, the system 1 comprises a first mesh receiving unit configured to receive the first mesh 100 and the system 1 further comprises a second mesh receiving unit configured to receive the second mesh 101, wherein the second mesh receiving unit is different from the first mesh receiving unit.

According to an embodiment shown in FIG. 5A, a first mesh 100 comprises four mesh vertices 104 labelled A; B; C; D and five mesh edges 105. According to an embodiment shown in FIG. 5B, a second mesh 101 comprises seven 3D mesh vertices 102 labelled A'; B'; C'; D'; E'; F'; G' and twelve 3D mesh edges 103. The second mesh 101 is a three-dimensional mesh and the second mesh 101 is different from the first mesh 100. The system according to an embodiment depicted on FIG. 1 or FIG. 2 or FIG. 3 or FIG. 4 then transfers the first mesh 100 into the second mesh 101, or alternatively the method according to an embodiment depicted on FIG. 6 transfers the first mesh 100 into the second mesh 101. The first mesh 100 is mapped onto the second mesh 101 in function of a UV map, thereby generating a combined mesh 200 depicted on FIG. 5C. The combined mesh 200 comprises combined vertices 202 which correspond to the four mesh vertices 104 labelled A; B; C; D of the first mesh 100 and also to the seven 3D mesh vertices 102 labelled A'; B'; C'; D'; E'; F'; G'. The combined mesh 200 further comprises intersection vertices 201 labelled e; f; g; h; i; j; k which are formed between the first mesh 100 and the second mesh 101 in the combined mesh 200. More particularly, the combined mesh 200 comprises intersection vertices 201 labelled e; f; g; h; i; j; k formed between the mesh edges 105 and the 3D mesh edges 103. The combined mesh 200 further comprises combined intersection edges 205 calculated between the intersection vertices 201 labelled e; f; g; h; i; j; k and the combined vertices 202 in the combined mesh 200. More particularly, the first mesh 100 is extruded along normal of the combined mesh 200, thereby forming extruded walls of the first mesh 100. And the combined mesh further comprises combined intersection vertices 204 labelled l; m formed between the extruded walls of the first mesh and the combined edges 203 of the combined mesh 200. The combined mesh 200 further comprises combined intersection edges 205 formed between the combined intersection vertices 204 labelled l; m and the combined vertices 202 in the combined mesh 200. It is clear that the embodiment shown in FIG. 5C is one example of a combined mesh achievable with the present invention.

Figure 6:
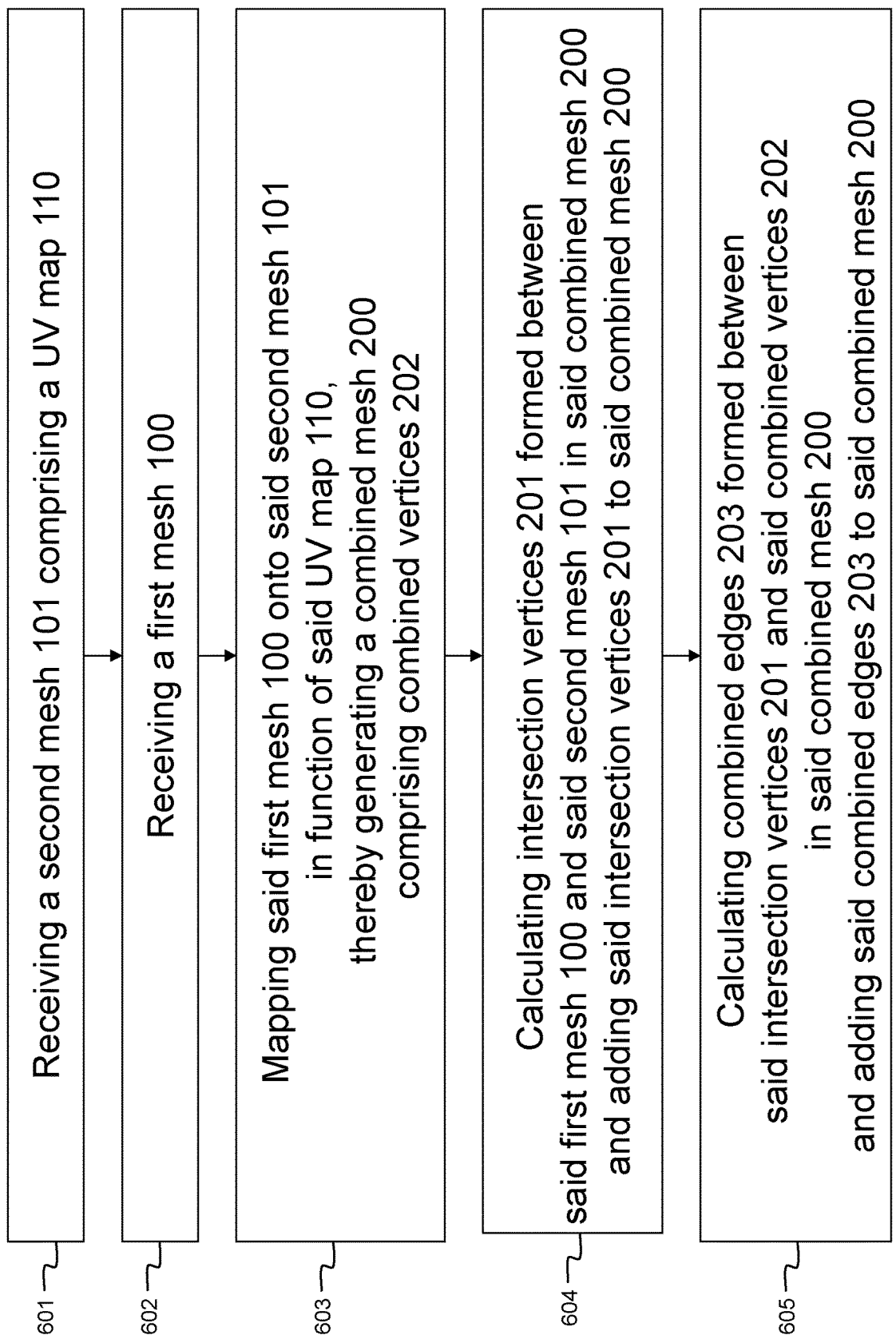
FIG. 6 schematically illustrates an embodiment of the steps of the method according to the present invention.

According to an embodiment shown in FIG. 6, the steps of a method for transferring a first mesh 100 into a second mesh 101 are depicted. In step 601, a second mesh 101 is received, wherein the second mesh 101 comprises a UV map 110. The second mesh 101 is a three-dimensional mesh and the second mesh 101 is different from the first mesh 100. In step 602, a first mesh 100 is then received. Then, in step 603, the first mesh 100 is mapped onto the second mesh 101 in function of the UV map 110, and a combined mesh 200 is thereby generated. The combined mesh 200 comprises combined vertices 202. Then, in step 604, intersection vertices 201 formed between the first mesh 100 and the second mesh 101 in the combined mesh 200 are calculated. The intersection vertices 201 are then added to the combined mesh 200. Finally, in step 605, combined edges 203 formed between the intersection vertices 201 and the combined vertices 202 in the combined mesh 200 are calculated and added to the combined mesh 200.

Figure 7:
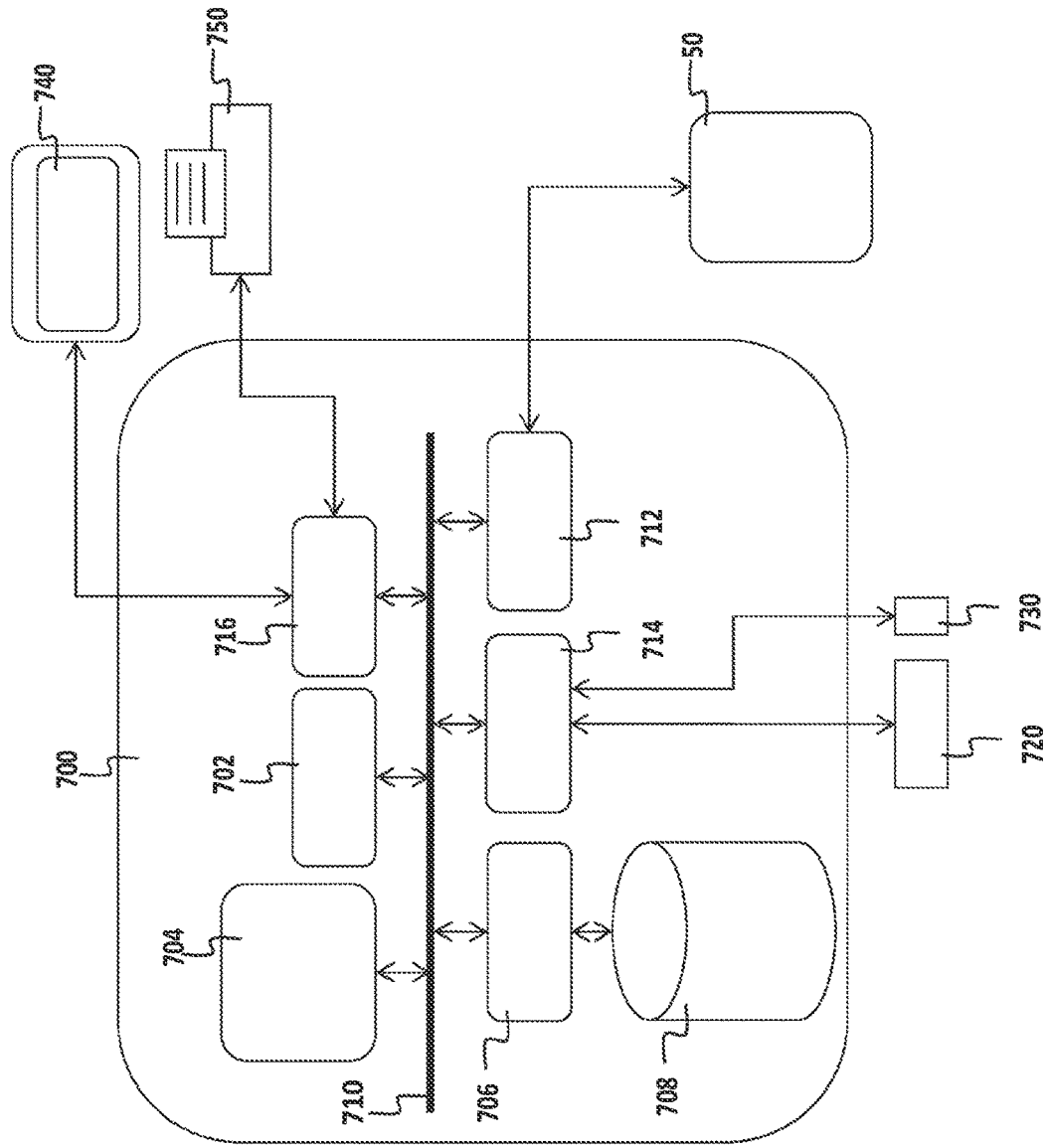
FIG. 7 schematically illustrates a suitable computing system for hosting the system of FIG. 1.

FIG. 7 shows a suitable computing system 700 for hosting the system 1 of FIG. 1. Computing system 700 may in general be formed as a suitable general purpose computer and comprise a bus 710, a processor 702, a local memory 704, one or more optional input interfaces 714, one or more optional output interfaces 716 a communication interface 712, a storage element interface 706 and one or more storage elements 708. Bus 710 may comprise one or more conductors that permit communication among the components of the computing system. Processor 702 may include any type of conventional processor or microprocessor that interprets and executes programming instructions. Local memory 704 may include a random access memory (RAM) or another type of dynamic storage device that stores information and instructions for execution by processor 702 and/or a read only memory (ROM) or another type of static storage device that stores static information and instructions for use by processor 704. Input interface 714 may comprise one or more conventional mechanisms that permit an operator to input information to the computing device 700, such as a keyboard 720, a mouse 730, a pen, voice recognition and/or biometric mechanisms, etc. Output interface 716 may comprise one or more conventional mechanisms that output information to the operator, such as a display 740, a printer 750, a speaker, etc. Communication interface 712 may comprise any transceiver-like mechanism such as for example two 1 Gb Ethernet interfaces that enables computing system 700 to communicate with other devices and/or systems, for example mechanisms for communicating with one or more other computing systems 50. The communication interface 712 of computing system 700 may be connected to such another computing system by means of a local area network (LAN) or a wide area network (WAN, such as for example the internet, in which case the other computing system 780 may for example comprise a suitable web server. Storage element interface 706 may comprise a storage interface such as for example a Serial Advanced Technology Attachment (SATA) interface or a Small Computer System Interface (SCSI) for connecting bus 710 to one or more storage elements 708, such as one or more local disks, for example 1 TB SATA disk drives, and control the reading and writing of data to and/or from these storage elements 708. Although the storage elements 708 above is described as a local disk, in general any other suitable computer-readable media such as a removable magnetic disk, optical storage media such as a CD or DVD, -ROM disk, solid state drives, flash memory cards, . . . could be used. The system 700 described above can also run as a Virtual Machine above the physical hardware.

The system 1 of FIG. 1 can be implemented as programming instructions stored in local memory 704 of the computing system 700 for execution by its processor 702. Alternatively, system 1 of FIG. 1 could be stored on the storage element 708 or be accessible from another computing system 50 through the communication interface 712.

Figure 8:
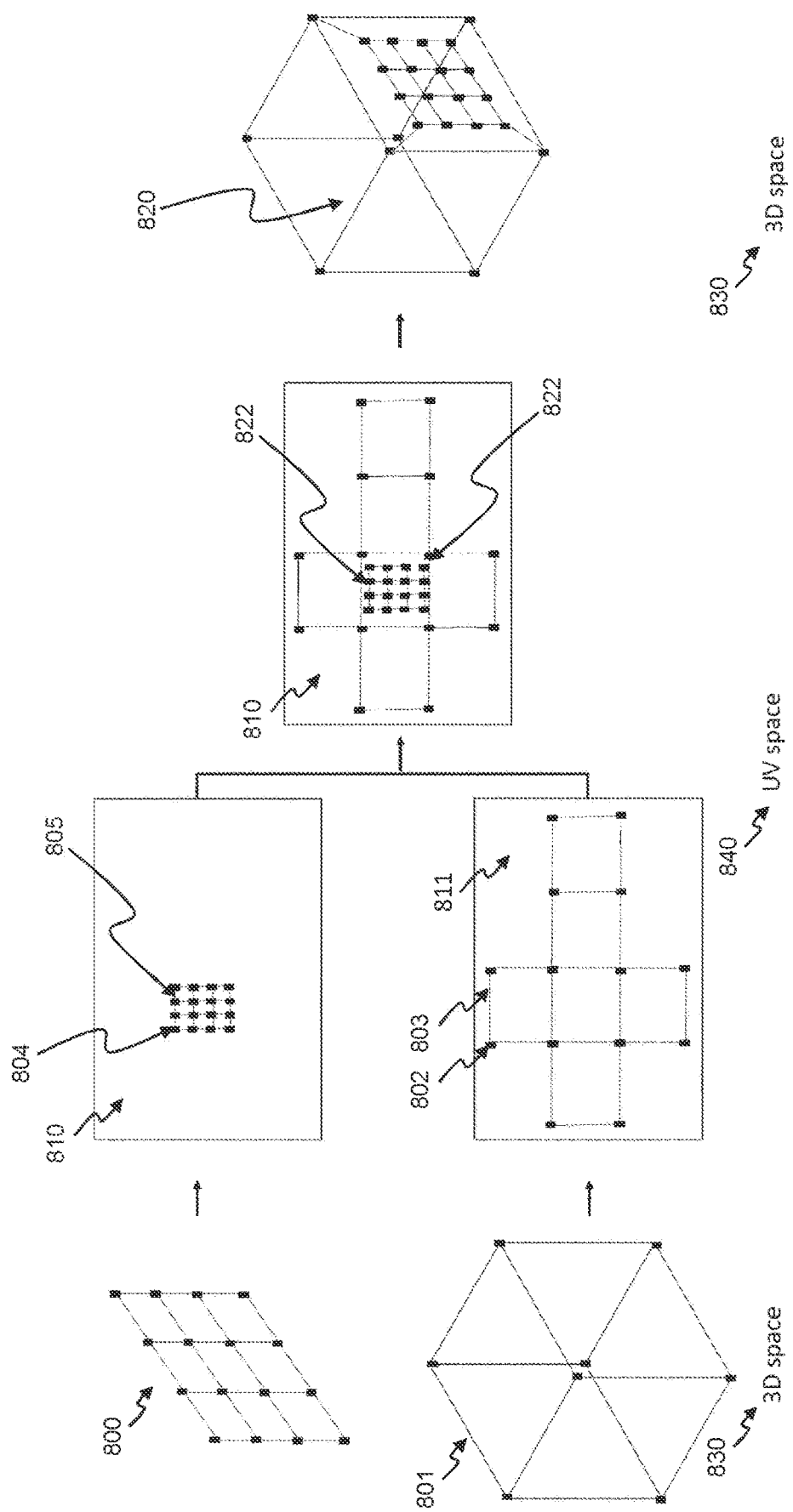
FIG. 8 schematically illustrates the UV mapping of a first 2D mesh onto a second mesh which is non-flat.

According to an embodiment shown in FIG. 8, a first mesh 800—which is a 2D mesh—comprising a first UV map 810 is mapped onto a second mesh 801 comprising a second UV map 811 in function of the first UV map. The first mesh 800 and the second mesh 801 are defined in a 3D space 830. The first mesh 800 comprises mesh vertices 804 and mesh edges 805 and the second mesh 801 comprises 3D mesh vertices 802 and 3D mesh edges 803. In a UV space 840, the first mesh 800 is mapped onto the second mesh 801 using the inverse of the second UV map 811. Preferably, the image of the second UV map 810 comprises the first mesh 800. In other words, the vertices of the first mesh 800 are mapped to adequate positions on the second mesh 801 in the UV space 840. According to an alternative embodiment, an affine transformation is performed on the first mesh 800 when the image of the second UV map 811 does not comprise the first mesh 800 such that the first mesh 800 is transformed into the image of the second UV map 811. A combined mesh 820 comprising combined vertices 822 corresponding to the mesh vertices 804 and the 3D mesh vertices 802 in the UV space 840 is therefore generated and rendered back into the 3D space 830.

Figure 9:
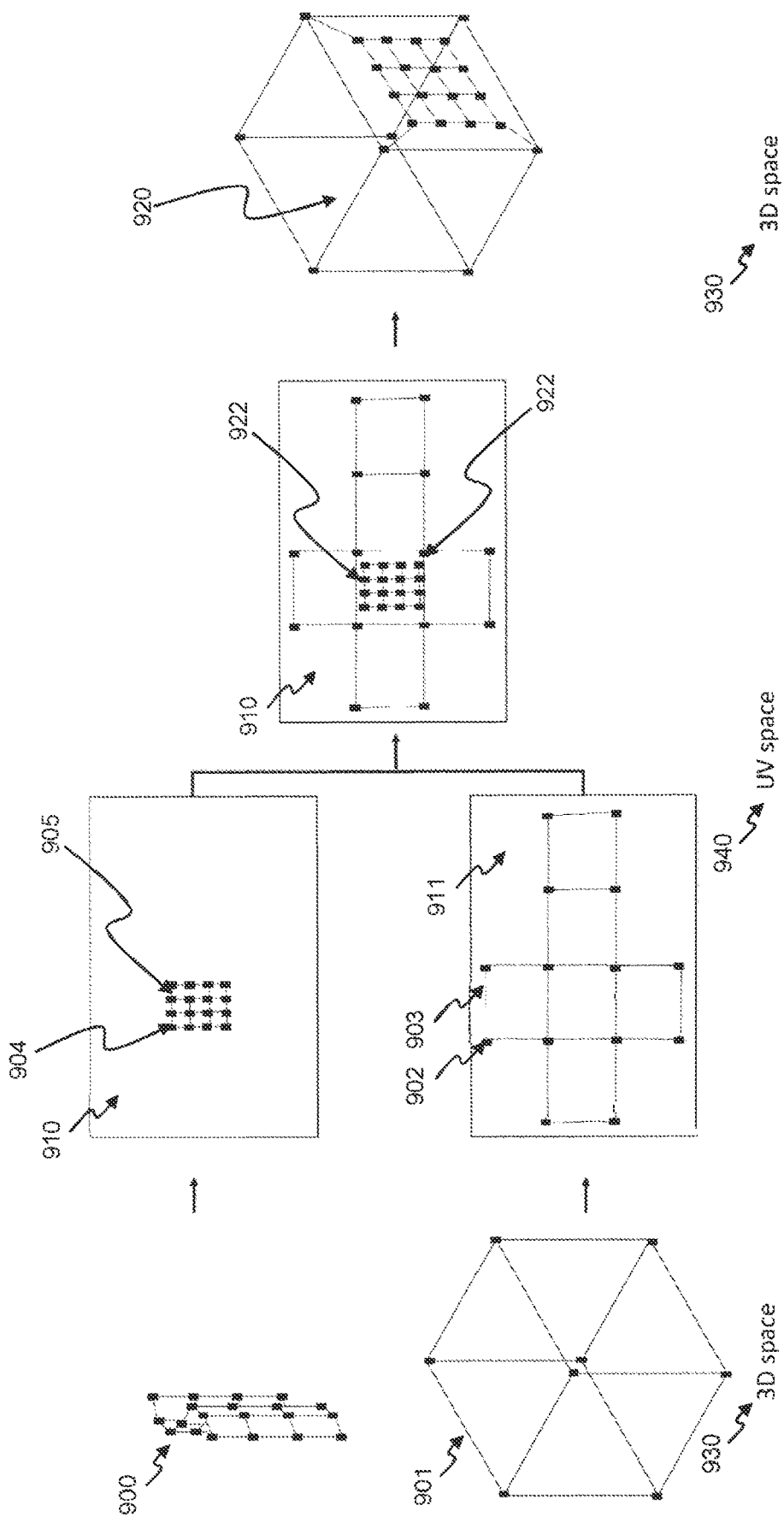
FIG. 9 schematically illustrates the UV mapping of a first mesh which is non-flat onto a second mesh which is non-flat.

According to an embodiment shown in FIG. 9, a first mesh 900—which is a 3D mesh—comprising a first UV map is mapped onto a second mesh 901 comprising a second UV map in function of the first UV map. The first mesh 900 and the second mesh 901 are defined in a 3D space 930. The first mesh 900 comprises mesh vertices 904 and mesh edges 905 and the second mesh 901 comprises 3D mesh vertices 902 and 3D mesh edges 903. In a UV space 940, the first mesh 900 is mapped onto the second mesh 901 using the inverse of the second UV map 911. Preferably, the image of the second UV map 911 comprises the first mesh 900. In other words, the vertices of the first mesh 900 are mapped to adequate positions on the second mesh 901 in the UV space 940. According to an alternative embodiment, an affine transformation is performed on the first mesh 900 when the image of the second UV map 911 does not comprise the first mesh 900 such that the first mesh 900 is transformed into the image of the second UV map 911. A combined mesh 920 comprising combined vertices 922 corresponding to the mesh vertices 904 and the 3D mesh vertices 902 in the UV space 940 is therefore generated and rendered back into the 3D space 930.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A system for transferring geometry of a first mesh into a second mesh, said system comprising:
    a mesh receiving unit configured to receive a first mesh, wherein said first mesh comprises a first UV map and is diffeomorphic to a flat mesh, and a second mesh,
    wherein said second mesh is a three-dimensional mesh different from said first mesh, and
    wherein said second mesh comprises a second UV map, the second UV map being separate and distinct from the first UV map;
    a mapping unit configured to map said first mesh onto said second mesh in function of said first UV map by translating mesh vertices of said first mesh to positions on said second mesh using an inverse of said second UV map, thereby generating a combined mesh comprising combined vertices, wherein said combined vertices comprise all vertices of said first mesh and all vertices of said second mesh;
    an intersection calculating unit configured to calculate intersection vertices formed between said first mesh and said second mesh in said combined mesh and further configured to add said intersection vertices to said combined mesh; and
    an edge calculating unit configured to calculate combined edges between said intersection vertices and said combined vertices;
    wherein said edge calculating unit is further configured to add said combined edges to said combined mesh.

2. The system according to claim 1, wherein said second mesh comprises a plurality of n-polygons, wherein n≥3.

3. The system according to claim 1, wherein:
    said mesh receiving unit is configured to receive 3D mesh vertices and 3D mesh edges of said second mesh; and
    said mesh receiving unit is further configured to receive mesh vertices and mesh edges of said first mesh;
    said mapping unit is configured to map said mesh vertices to said second mesh in function of said first UV map, thereby generating said combined mesh comprising said combined vertices;
    said intersection calculating unit is configured to calculate said intersection vertices formed between said mesh edges and said 3D mesh edges in said combined mesh and further configured to add said intersection vertices to said combined mesh.

4. The system according to claim 1, wherein an image of said second UV map comprises said first mesh.

5. The system according to claim 1, wherein said system further comprises an affine transforming unit configured to apply an affine transformation on said first mesh when an image of said second UV map does not comprise said first mesh; and
    wherein said affine transforming unit is thereby configured to transform said first mesh into the image of said second UV map.

6. The system according to claim 1, wherein said intersection calculating unit is further configured to extrude said first mesh along normals of said combined mesh, thereby forming extruded walls of said first mesh; and
    wherein said intersection calculating unit is further configured to identify combined intersection vertices formed between said extruded walls and said combined edges of said combined mesh.

7. The system according to claim 6, wherein said edge calculating unit is further configured to calculate combined intersection edges between said combined intersection vertices and said combined vertices in said combined mesh.

8. The system according to claim 1, wherein said mapping unit is configured to apply inverse UV mapping.

9. A method for transferring geometry of a first mesh into a second mesh, said method comprising the steps of:
    receiving a first mesh, wherein said first mesh comprises a first UV map and is a mesh diffeomorphic to a flat mesh;
    receiving a second mesh, wherein said second mesh is a three-dimensional mesh different from said first mesh and wherein said second mesh comprises a second UV map, the second UV map being separate and distinct from the first UV map;
    mapping said first mesh onto said second mesh in function of said first UV map by translating mesh vertices of said first mesh to positions on said second mesh using an inverse of said second UV map, thereby generating a combined mesh comprising combined vertices, wherein said combined vertices comprise all vertices of said first mesh and all vertices of said second mesh;
    calculating intersection vertices formed between said first mesh and said second mesh in said combined mesh; and
    further adding said intersection vertices to said combined mesh; and
    calculating combined edges between said intersection vertices and said combined vertices in said combined mesh; and
    further adding said combined edges to said combined mesh.

10. The method according to claim 9, wherein:
said receiving a second mesh corresponds to receiving 3D mesh vertices and 3D mesh edges of said second mesh;
said receiving a first mesh corresponds to receiving mesh vertices and mesh edges of said first mesh;
said mapping said first mesh into said second mesh in function of said first UV map corresponds to mapping said mesh vertices to said second mesh in function of said first UV map by translating mesh vertices of said first mesh to positions on said second mesh using an inverse of said second UV map, thereby generating said combined mesh comprising said combined vertices, wherein said combined vertices comprise all vertices of said first mesh and all vertices of said second mesh; and
said calculating said intersection vertices corresponds to calculating said intersection vertices formed between said mesh edges and said 3D mesh edges and further adding said intersection vertices to said combined mesh.

11. A non-transitory computer readable storage medium comprising software code adapted to perform the method according to claim 9.

12. A non-transitory computer readable storage medium comprising computer-executable instructions which, when executed by a computing system, perform a method according to claim 9.

* * * * *